3,463,768
METHOD OF REACTING ROSIN WITH FORMALDEHYDE
Edward Strazdins, Stamford, Conn., assignor to American Cyanamid Company, Stamford, Conn., a corporation of Maine
No Drawing. Filed Oct. 27, 1966, Ser. No. 589,851
Int. Cl. C09f 1/04
U.S. Cl. 260—97          6 Claims

ABSTRACT OF THE DISCLOSURE

A rosin is reacted with a minor amount of formaldehyde at 130° C–200° C. in the absence of an acid catalyst, an acid dehydration catalyst is added to the rosin, and the resulting mixture is maintained at 150–220° C. until evolution of water has subsequently ceased. The rosin employed may be a fortified rosin, or the rosin may be an unfortified rosin and may be reacted with a fortifying agent during the steps described.

---

The present invention relates to an improvement in the treatment of rosin with formaldehyde.

Watkins U.S. Patents Nos. 2,941,919 and 2,985,537 disclose that rosin is improved when it is reacted with formaldehyde in the presence of an acid catalyst. The acid catalyst both facilitates the reaction of the formaldehyde with the rosin and dehydrates the methylol groups which are introduced into the rosin by the formaldehyde. Strazdins U.S. Patents Nos. 2,943,468 and 3,132,127 disclose the reaction of rosin with formaldehyde in the absence of an acid catalyst and then heat-treating the resulting reaction product to decrease its latent foaming tendency. The resulting rosins possess decreased tendency to crystallize when in molten state at temperatures below about 140° C. The presence of a strong acid during reaction of rosin with formaldehyde causes appreciable darkening of the rosin which is a disadvantage when the rosin is used as a paper size, and is a serious disadvantage when the rosin is used as a raw material for varnish and ester gum. The heat treatment step causes a decrease in the acid number of the rosin, which is a disadvantage when the rosin is used as a raw material for the manufacture of paper size.

The discovery has now been made that the darkening resulting from the use of an acid catalyst and the decrease in acid number resulting from subjection of rosin to elevated temperatures are decreased when the reaction of rosin with formaldehyde is performed in two steps.

According to the present invention, in the first step, the rosin is reacted with the formaldehyde at a temperature between 130° C. and 200° C. in the absence of any strong acid (including acid dehydration catalyst). In the second step, an acid dehydration catalyst is added and the rosin is maintained in the range of 150° C. to 220° C. until dehydration of the methylol groups has substantially ceased. In preferred instances, the color of the rosin of the present invention is two letters better on the U.S. Department of Agriculture official rosin color standards scale, and the acid number of the rosin is 10–15 points better.

In general, according to the invention, tall oil rosin or other rosin having pronounced crystallizing tendencies is mixed with a minor amount, for example $\frac{1}{20}$ up to 1 mol of formaldehyde (preferably as paraformaldehyde), as anticrystallizing agent, and the mixture is maintained at 140° C.–200° C. in a closed reactor (to prevent loss of paraformaldehyde) until the reaction has gone to completion. The reactor is then vented and a small amount of a suitable acid dehydration catalyst is added in effective catalytic amount, for example between $\frac{1}{20}$% and $\frac{1}{2}$% by weight, with stirring. When evolution of water ceases, as evidenced by cessation of frothing and foaming, the catalyst is neutralized and the rosin is cooled to desired storage temperature. The resulting rosin is suitable for conversion to ester gum, for conversion to heavy metal rosinate varnish bases, and for conversion to rosin size. The starting rosin employed may be wood rosin or gum rosin, but the invention is most usefully employed in connection with tall oil rosin, the strong crystallizing tendencies of which are markedly inhibited by the presence of the reacted formaldehyde. Moreover, the starting rosin may be a fortified rosin, that is, a rosin which has a reacted content of a minor amount but effective amount of an acidic compound containing the —CO—C=C— group as fortifying agent such as maleic anhydride, fumaric acid, acetylene dicarboxylic acid and the dehydration products of citric acid. Typically $\frac{1}{70}$ to $\frac{1}{4}$ mol of one or a mixture of these compounds is used for the purpose.

The most pronounced improvement occurs when the starting rosin is a very light colored rosin, for example, WW (water white) tall oil rosin.

When the starting rosin is unfortified, it is within the scope of the present invention to add one of the aforementioned or other similarly fortified agents in similar amount to the rosin either along with or after addition of the formaldehyde, that is, during or after the dehydration step.

Since the entire process of the present invention can be performed below 200° C., fumaric acid can be employed as fortifying agent without danger of its passing to the less effective maleic form during any part of the process, and this is an important advantage of the process.

The dehydration catalysts are in general the strong mineral acids and materials which release or which act as strong mineral acids when heated. Preferably they are nonvolatile, and sulfuric acid, phosphoric acid, and p-toluenesulfonic acid are suitable; see Watkins patents for illustrations.

The reaction of the formaldehyde in the process of the present invention is best performed at a temperature in the range of 140° C.–180° C. In this range, the reaction proceeds satisfactorily fast, and yet color degradation and decarboxylation and esterification are at low levels.

Neutralization of the acid catalyst is performed only when the intended use of the rosin makes it desirable. Any base may be used for the purpose which, however, most advantageously is nonvolatile.

The invention is more particularly illustrated by the examples which follow. These illustrate preferred embodiments of the invention and are not to be construed as limitations thereon.

EXAMPLE 1

The following illustrates the preparation of formaldehyde-reacted rosin size of superior color and acid number according to the present invention.

Approximately one mol (326 g.) of water-white tall oil rosin (color WW, U.S. Dept. of Agriculture rosin color scale, acid number 172) at 140° C. in a laboratory autoclave provided with stirrer is purged with nitrogen gas, and $\frac{1}{3}$ mol (10 g.) of paraformaldehyde is added. The autoclave is sealed, and the mixture stirred at 150° C. for two hours at which point reaction of the paraformaldehyde is completed, as indicated by a sharp decrease in the autoclave pressure. The autoclave is opened, 0.4 g. (0.1% by weight) of 80% sulfuric acid is added with stirring, and the mixture is heated under a blanket of nitrogen gas to 175° C. The mixture foams vigorously owing to formation and evolution of water. When evolution of water has substantially ceased (after about an hour), the sulfuric acid is neutralized by addition of 0.55 g. sodium bicarbonate, and the product is cooled to 120° C. The color of the product is N and its acid number is 168. This represents a slight decrease in color and substantially no decrease in acid number, the decrease of 4 points in acid number being almost wholly due to the dilution effect of the paraformaldehyde.

EXAMPLE 2

The procedure of Example 1 is repeated, except that 1/7 mol (16.5 g.) of fumaric acid is added simultaneously with the paraformaldehyde, and the temperature at which the formaldehyde-reacted rosin is dehydrated is increased to 190° C. A similar but well-fortified rosin is obtained.

EXAMPLE 3

The procedure of Example 1 is repeated, except that 1/7 mol of fumaric acid is added along with the acid catalyst and the dehydration temperature is increased to 190° C. A similar but well-fortified rosin is obtained.

I claim:
1. Process for the preparation of formaldehyde-reacted rosin of superior color and acid number and of low cystallizing and foaming tendency, which comprises reacting a rosin at a temperature between 130° C. and 200° C. with a minor amount of formaldehyde as anticrystallizing agent in the absence of an acid catalyst, mixing an acid dehydration catalyst into the thus-reacted rosin, and maintaining the resulting mixture at a temperature in the range of 150° C. to 220° C. until evolution of water therefrom has substantially ceased.

2. A process according to claim 1 wherein the formaldehyde is reacted with the rosin at a temperature between 140° C. and 180° C.

3. A process according to claim 1 wherein a minor amount for fortifying agent of an organic compound of acid character containing a —CO—C=C— group is reacted with the rosin concurrently with the formaldehyde.

4. A process according to claim 3 wherein the organic compound containing the —CO—C=C— group is fumaric acid.

5. A process according to claim 1 wherein a minor amount as fortifying agent of a compound of acid character containing a —CO—C=C— group is added along with said catalyst.

6. A process according to claim 1 wherein the starting rosin is tall oil rosin of WW color according to the U.S. Department of Agriculture rosin color scale.

References Cited
UNITED STATES PATENTS

| | | | |
|---|---|---|---|
| 2,934,468 | 4/1960 | Strazdins | 162—180 |
| 2,941,919 | 6/1960 | Watkins | 260—97.5 |
| 2,985,537 | 5/1961 | Watkins | 260—97.5 |
| 2,994,635 | 8/1961 | Reaville et al. | 260—97.5 |
| 3,132,127 | 5/1964 | Strazdins | 260—97.5 |
| 3,361,619 | 1/1968 | Aldrich | 260—97.5 |

DONALD E. CZAJA, Primary Examiner
WILLIAM E. PARKER, Assistant Examiner

U.S. Cl. X.R.
260—17.5